(12) United States Patent
Buchholz et al.

(10) Patent No.: US 9,668,452 B2
(45) Date of Patent: Jun. 6, 2017

(54) DEVICE FOR PRODUCTION OF DAIRY PRODUCTS, ESPECIALLY MILK FOAM

(71) Applicant: MELITTA PROFESSIONAL COFFEE SOLUTIONS GMBH & CO. KG, Minden (DE)

(72) Inventors: Bernd Buchholz, Rahden (DE); Thomas Diester, Bueckeburg (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 147 days.

(21) Appl. No.: 14/264,993

(22) Filed: Apr. 29, 2014

(65) Prior Publication Data

US 2014/0322412 A1   Oct. 30, 2014

(30) Foreign Application Priority Data

Apr. 29, 2013   (DE) .......................... 10 2013 104 339

(51) Int. Cl.
- *A01J 11/04* (2006.01)
- *A23C 7/00* (2006.01)
- *A47J 31/44* (2006.01)

(52) U.S. Cl.
CPC ................. *A01J 11/04* (2013.01); *A23C 7/00* (2013.01); *A47J 31/4485* (2013.01)

(58) Field of Classification Search
CPC ............................... A23C 7/00; A47J 31/4485
See application file for complete search history.

(56) References Cited

U.S. PATENT DOCUMENTS

| | | | |
|---|---|---|---|
| 3,728,129 A * | 4/1973 | Sargeant | B67D 1/0043 137/889 |
| 6,006,654 A * | 12/1999 | Pugh | A47J 31/4485 261/DIG. 76 |
| 6,681,685 B2 | 1/2004 | Mahlich | |
| 6,713,110 B2 * | 3/2004 | Imboden et al. | A47J 31/4485 261/DIG. 16 |

(Continued)

FOREIGN PATENT DOCUMENTS

| CA | 2843345 | * | 2/2013 |
|---|---|---|---|
| DE | 19719784 | * | 7/1998 |

(Continued)

OTHER PUBLICATIONS

English Translation for DE102006023450 published Nov. 2007.*
English Translation for DE19719784 published Jul. 1998.*

*Primary Examiner* — Anthony Weier
(74) *Attorney, Agent, or Firm* — FisherBroyles, LLP; Robert Kinberg

(57) ABSTRACT

A process for producing milk foam includes pumping milk through a milk line with a milk pump having an adjustable speed for adjusting the capacity of the milk pump. Milk from the milk line and air are mixed inside a first mixing chamber to produce a milk foam. Properties of the milk foam, including a consistency of the milk foam, are a function of the speed of the milk pump. A device for producing the milk foam includes a milk container; an outlet; a milk line connected between the milk container and the outlet; a first mixing chamber installed in the milk line to mix milk and air to produce milk foam; and a milk pump having an adjustable speed coupled into the milk line.

8 Claims, 11 Drawing Sheets

(56) References Cited

U.S. PATENT DOCUMENTS

| | | | |
|---|---|---|---|
| 7,097,074 B2 * | 8/2006 | Halliday | A47J 31/0673 222/325 |
| 7,231,869 B2 * | 6/2007 | Halliday | A47J 31/0673 99/289 R |
| 7,255,039 B2 * | 8/2007 | Halliday et al. | A47J 31/0673 49/248 |
| 7,316,178 B2 * | 1/2008 | Halliday | A47J 31/0673 99/295 |
| 7,328,651 B2 * | 2/2008 | Halliday et al. | A47J 31/0673 426/115 |
| 7,507,430 B2 * | 3/2009 | Stearns et al. | A47J 31/41 426/474 |
| 7,592,027 B2 * | 9/2009 | Halliday | A47J 31/0673 426/432 |
| 7,595,470 B1 * | 9/2009 | Sizer et al. | H05B 6/802 219/686 |
| 7,607,385 B2 * | 10/2009 | Halliday | A47J 31/0673 99/280 |
| 8,371,477 B2 * | 2/2013 | Klopfenstein et al. | B67D 1/0031 222/129.4 |
| 8,444,016 B2 * | 5/2013 | Lussi | A47J 31/40 222/129.4 |
| 8,657,262 B2 | 2/2014 | Burri et al. | |
| 8,820,577 B2 * | 9/2014 | Rusch et al. | B67B 7/28 222/129.1 |
| 2007/0048428 A1 * | 3/2007 | Green | A47J 43/12 426/564 |
| 2007/0272317 A1 * | 11/2007 | Klopfenstein | B67D 1/0031 137/889 |
| 2008/0050496 A1 * | 2/2008 | Boldor | B01F 3/0865 426/569 |
| 2008/0295699 A1 * | 12/2008 | Duineveld | A47J 31/407 99/302 R |
| 2009/0087532 A1 * | 4/2009 | Meier | A47J 31/4485 426/474 |
| 2009/0293733 A1 * | 12/2009 | Martin et al. | G07F 13/065 99/280 |
| 2010/0126354 A1 | 5/2010 | Mahlich | |
| 2010/0273273 A1 * | 10/2010 | Cross | A01J 5/0133 436/174 |
| 2011/0070349 A1 * | 3/2011 | Burri et al. | A47J 31/4485 426/474 |
| 2013/0280403 A1 * | 10/2013 | Reyhanloo | A47J 31/4485 426/570 |
| 2014/0322415 A1 * | 10/2014 | Buchholz | A01K 11/04 426/519 |
| 2015/0020691 A1 * | 1/2015 | Midden | A47J 31/4485 99/323.3 |

FOREIGN PATENT DOCUMENTS

| | | | |
|---|---|---|---|
| DE | 102006023450 | * | 11/2007 |
| EP | 1312292 | A1 | 5/2003 |
| EP | 1785074 | * | 5/2007 |
| EP | 2042063 | A1 | 4/2009 |

* cited by examiner

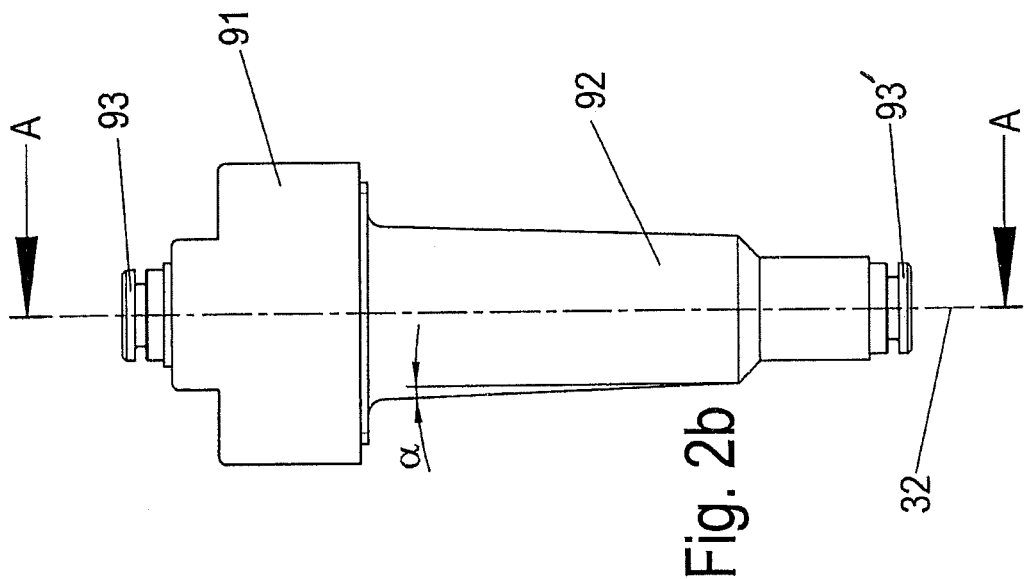
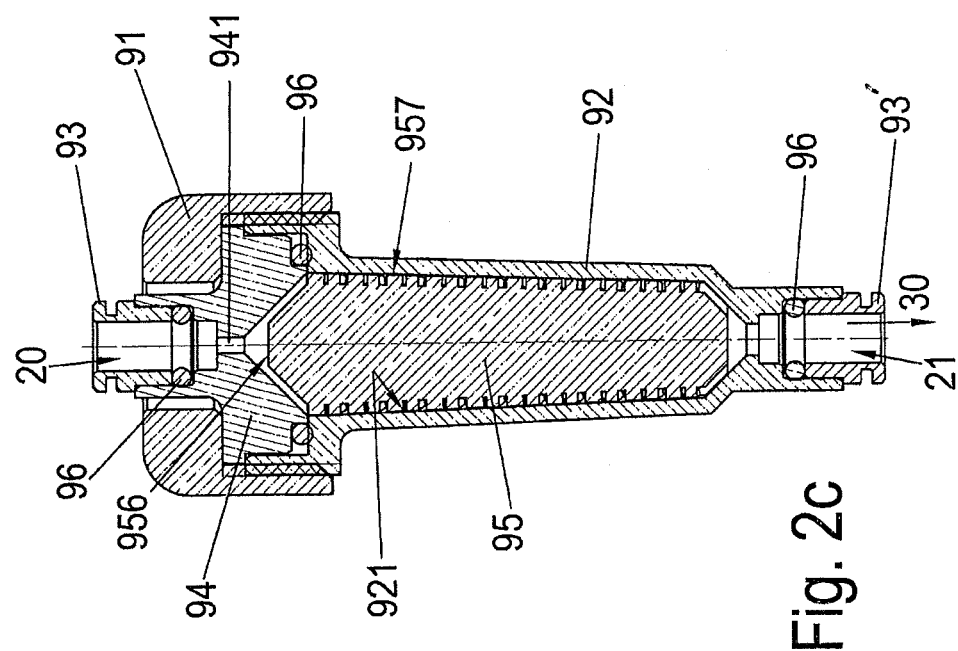

DEVICE FOR PRODUCTION OF DAIRY PRODUCTS, ESPECIALLY MILK FOAM

CROSS-REFERENCE TO RELATED APPLICATIONS

This application claims priority to German Patent Application No. 10 2013 104 339.9 filed Apr. 29, 2013, which is hereby incorporated by reference in its entirety.

BACKGROUND OF THE INVENTION

The invention relates to a process and a device for producing dairy products, in particular milk foam.

Different embodiments of these processes and devices are known from the prior art. As a rule, they are associated with an automatic coffee maker, as described in European patent documents EP 1 312 292 B1 and EP 2 042 063 A1. However, varying the foam properties is extremely difficult employing these known disclosures

SUMMARY OF THE INVENTION

It is an object of the present invention to provide an improved process and an improved device for producing milk foam.

The above and other objects are accomplished according to one aspect of the invention by the provision of a process for producing dairy products, in particular milk foam, which according to one embodiment includes pumping milk through a milk line with a milk pump having an adjustable speed; and mixing of milk and air inside a first mixing chamber to produce a milk foam, wherein a consistency of the milk foam is a function of the speed of the milk pump.

According to an embodiment of the invention, steam may be added to the milk foam to heat up the milk foam.

According to another embodiment, different dairy products can be produced easily, in particular different quality milk foams and thus also milk foams at different temperatures (hot or cold, in the latter case without steam supply) and consistency (especially with respect to smaller or larger bubbles). A milk pump with adjustable speed may be used for this, so that the pumping capacity can be adjusted easily. By varying the speed, the product property can furthermore be varied easily since the speed affects in particular the pressure ratios in the secondary processing device. These dairy products can be dispensed separately or, if applicable, in combination with a coffee beverage.

An infinite variety of dairy products can thus be produced according to the invention, in particular also cold and hot milk foams. For producing hot milk foams, an embodiment provides that steam may be added with respect to time and location after the air is added, so that the respective addition of air and steam may always be optimized. It is furthermore possible to dispense cold or hot milk for the most part without the creation of foam by correspondingly changing the parameters.

The invention results in the advantage that a product-related adjustment of the foam properties can be made and, preferably, also a so-to-speak continuous adjustment of the foam properties.

BRIEF DESCRIPTION OF THE DRAWINGS

The invention is described in the following in further detail with the aid of an exemplary embodiment and with reference to the drawing, showing in:

FIGS. 2a, 2b, 2c, and 2d—A secondary treatment device shown schematically in FIG. 1 for changing the consistency of the milk foam illustrated, respectively in a perspective view in FIG. 2a, a side view in FIG. 2b, a cross section in FIG. 2c and an enlarged, exploded view in FIG. 2d;

DETAILED DESCRIPTION OF THE INVENTION

Figure 1:
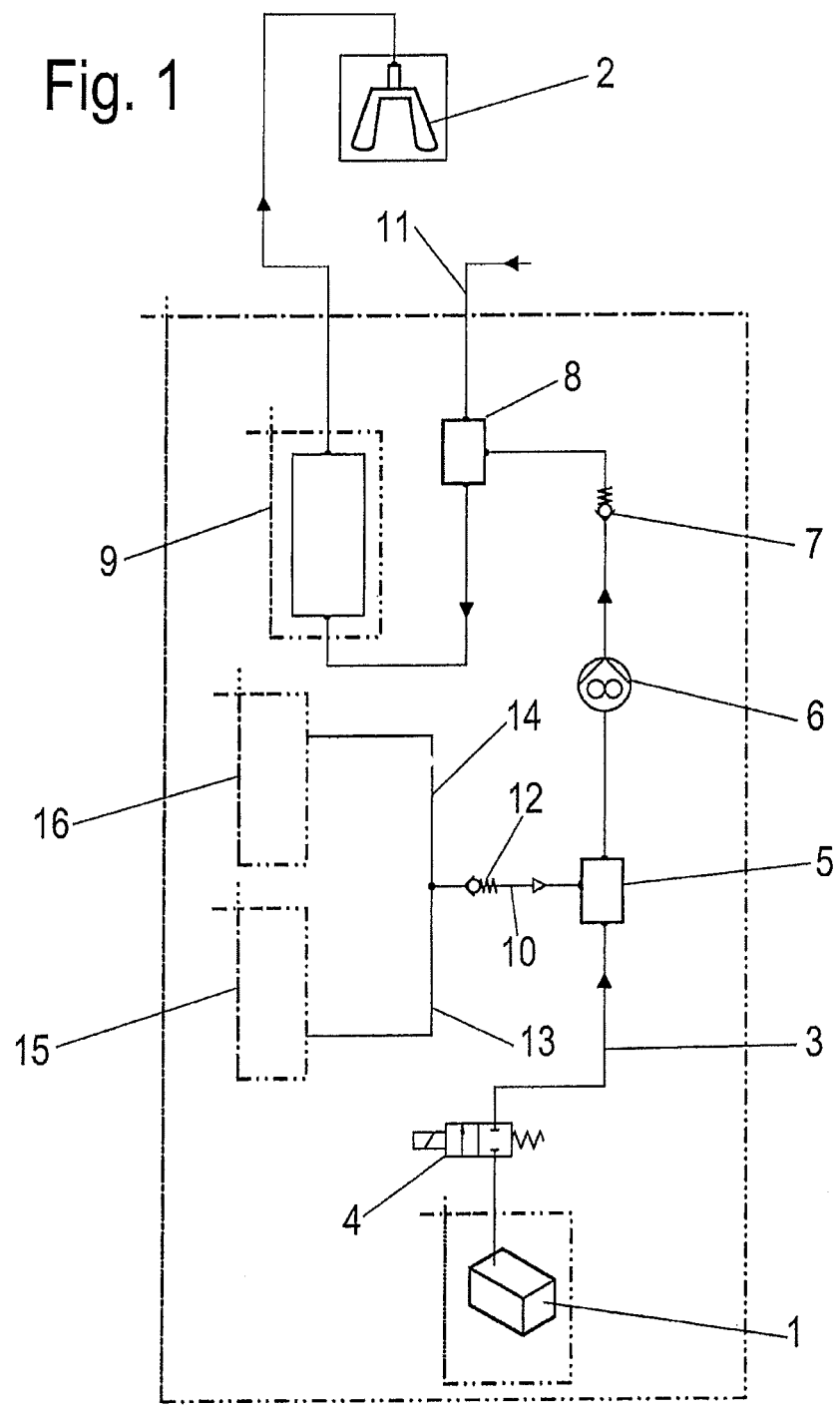
FIG. 1—A schematic in block diagram form representing a device for the foaming of milk according to the invention.

Referring to FIG. 1, there is shown a device for producing a dairy product, in particular milk foam. A milk line 3 connects a milk container 1 and an outlet device 2. The following components are installed in the milk line 3, between the milk container 1 and the outlet device 2, in the sequence as listed: a shutoff valve 4, a first mixing chamber 5, a milk pump 6, a first backpressure valve 7, a second mixing chamber 8 and a secondary processing device 9.

A feed line 10 with therein installed second backpressure valve 12 furthermore empties into the first mixing chamber 5, wherein the feed line 10 branches off into two branch lines 13, 14 in front of the second backpressure valve 12. The feed line 10 preferably empties through a nozzle with reduced diameter into the milk line in a ring-shaped chamber region, so as to accelerate the air prior to the introduction into the milk (not shown herein).

One of the branch lines 14 is connected to a first air source 16 (either an opening to the atmosphere, an air pump, or a pressure container or the like) while the other branch line 13 is connected to a second air source 15. In this way, different amounts of air can be suctioned in via different choke diameters in the two branch lines 13, 14, depending on the adjustment. For this, valves which are not shown herein are preferably installed in the branch lines. The amount of air can vary between two amounts, to be sure. However, the main goal is to change between supplying different amounts of air for cold or warm dairy products, in particular milk foam. The adjustment of the foam quality, however, in principle does not occur via the amount of air, but advantageously via a variation of the speed of the milk pump 6. It has turned out that in this way the product quality can be adjusted particularly easily and uniformly.

Furthermore emptying into the second mixing chamber 8 is a steam feed line 11 through which hot steam can be conducted from a hot steam source (not shown herein) into the milk line 3.

The function of this device is explained in further detail in the following.

Milk is pumped with the aid of the milk pump 6, installed in the milk line 3, from the milk container 1 to the outlet 2, wherein this pumping operation is preferably continuous during the time when milk foam is produced. Milk is preferably processed with a fat content of less than 10%, advantageously with less than 7.5% and especially preferred with less than 5%.

For this, the shutoff valve 4 is first switched from its shutoff position to the flow-through position.

Figure 5A:
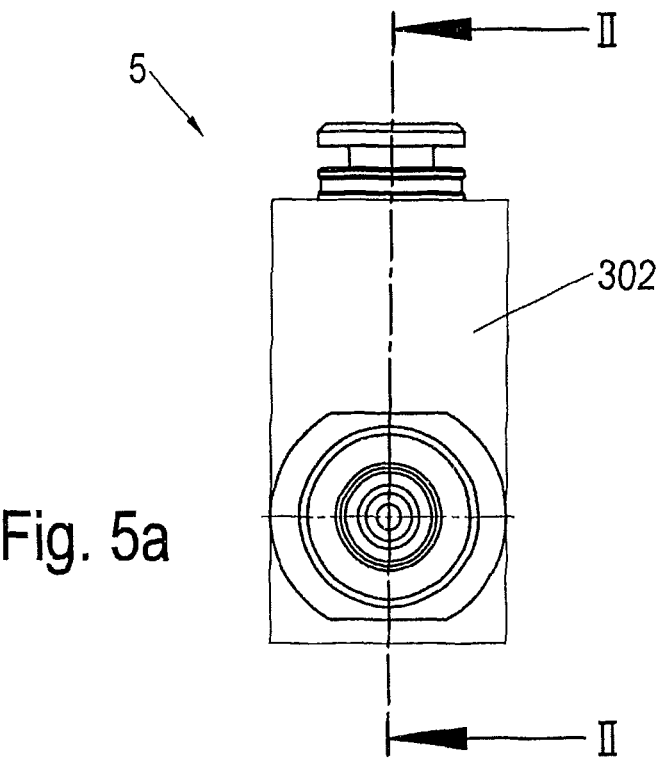
FIGS. 5a, 5b, and 5c—A ring jet nozzle for introducing air into the milk, including a front view of the nozzle in FIG. 5a and a cross sectional view from the side of the ring jet nozzle in FIG. 5b and a sectional view of from the front of the ring jet nozzle in FIG. 5c.
Figure 5C:
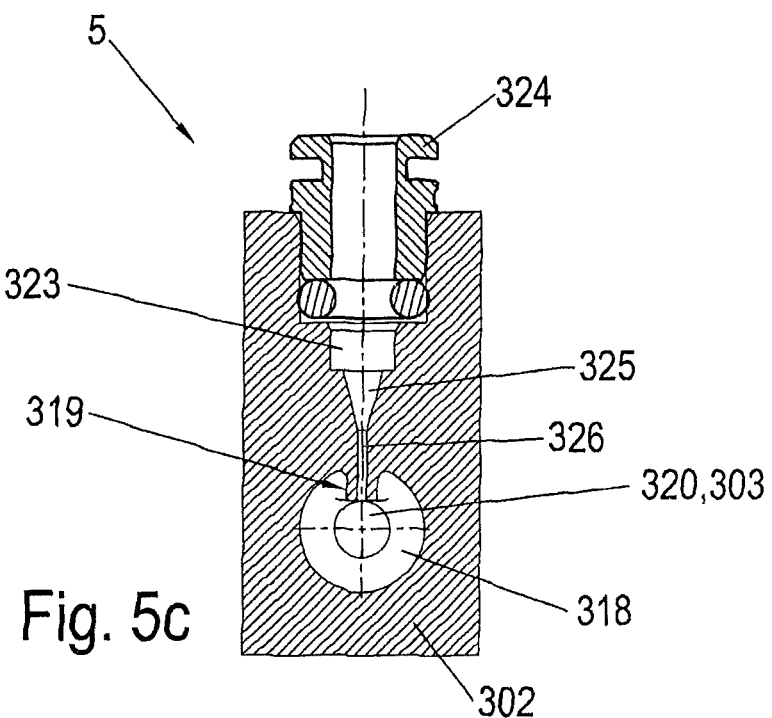
Figure 5B:
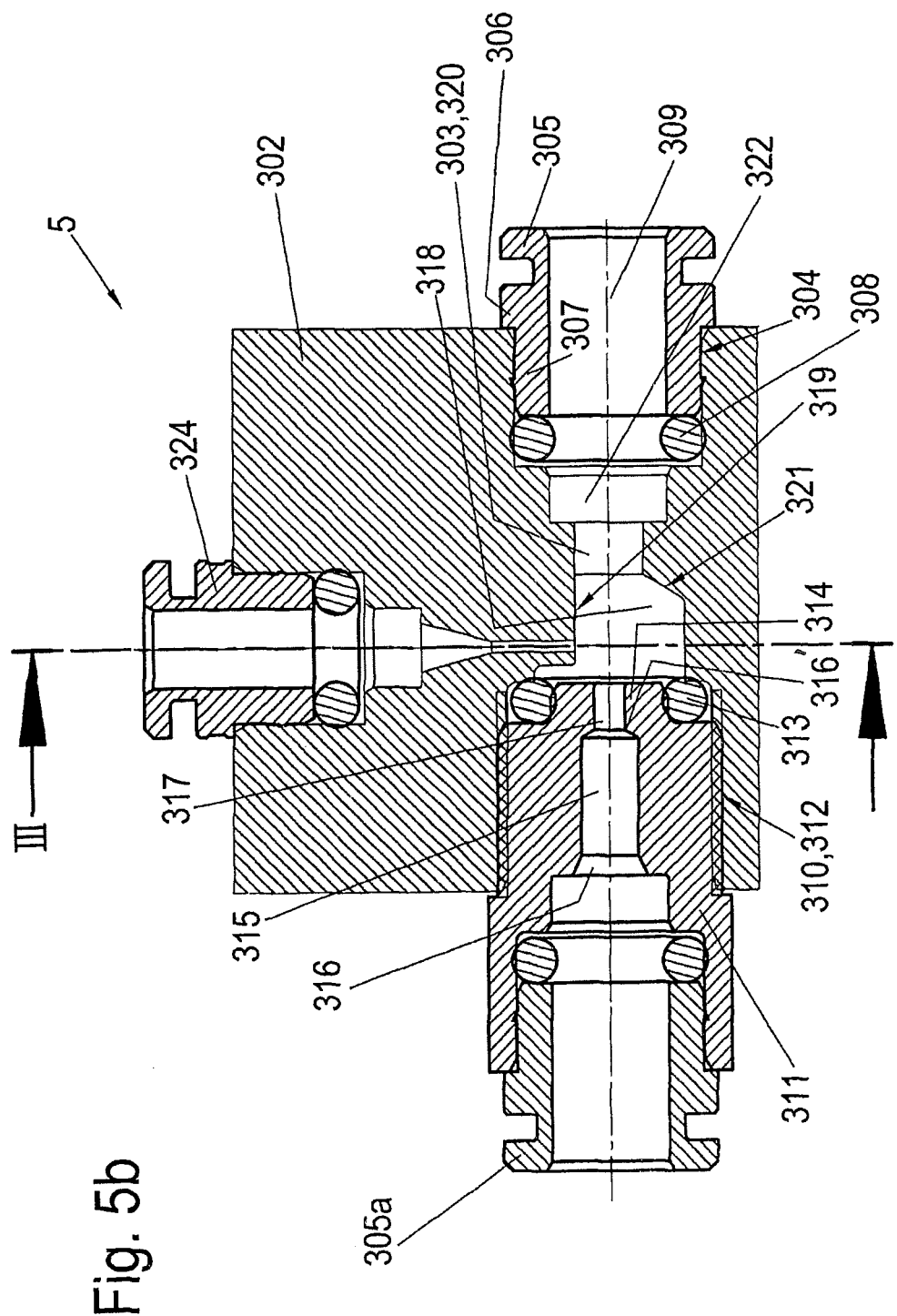

The milk is then pumped from the milk container 1 through the milk line 3 into the first mixing chamber 5. In the first mixing chamber 5—which can be embodied in the simplest form as a T section with a mixing chamber having an enlarged diameter (one embodiment that is particularly preferred and advantageous is shown in FIGS. 5a-5c)—air is introduced into the milk, flowing through the milk line 3, such that the milk and the inflowing air are mixed together to form a foam-type milk/air emulsion, also referred to herein as milk foam.

Devices such as a shutoff valve, one or several chokes and/or the like are preferably installed in the branch line 10 to be able to define, start and interrupt the supply of air. A fixed choke offers the advantage that a precisely defined amount of air is always supplied. Chokes are known per se to one skilled in the art and are therefore not shown herein. It is conceivable to switch the air supply between two chokes and/or choke configurations (air sources 15, 16).

During the milk foam production, the milk flowing through the first mixing chamber 5 is advantageously supplied continuously with a constant amount of air through suctioning in the air with the milk pump 6, to produce a milk/air emulsion with uniform properties, if possible.

The milk/air emulsion produced in the first mixing chamber 5 is then conducted further through the milk line 3 and the milk pump 6 where it is condensed. A milk pump 6 is preferably used for which the pumping amount can be adjusted. In this way it is thus possible to influence the milk foam properties essentially via the pumping capacity of the milk pump 6, so as to obtain different foam qualities (for example with respect to bubble size), which are particularly suitable for specialty coffees such as cappuccino or milk coffee or the like.

The condensed milk/air emulsion, flowing out the milk pump 6, is conducted further through a section with therein installed mixing chamber 8. In the second mixing chamber 8 (for example designed in the manner of a T section), the milk-air emulsion is supplied with hot steam, if necessary flowing in through the line 11, to create a warm/hot milk foam by increasing the temperature of the milk/air emulsion (if this is desired). If the steam supply is stopped or is kept very low, then cold or nearly cold milk foam is produced.

The second mixing chamber 8 is followed by a decompression section of the milk line 3 which empties into the secondary processing device.

To be sure, the heated up milk foam flowing from the second mixing chamber 8 and the decompression section could already be dispensed into a container.

However, this is preferably not the case and the foam is initially treated further in the secondary processing device 9 to purposely change the foam quality.

This secondary processing device 9 is advantageously embodied as a homogenizer, such that the heated up milk foam from the second mixing chamber is "homogenized" with respect to its properties. The secondary processing is realized such that the bubbles in the milk foam are reduced in size during the one-time or repeated impact with impact walls, for example embodied as a channel labyrinth section.

The type of secondary processing, in turn, depends strongly on the pumping capacity and/or the speed of the milk pump 6, meaning on the pressure at which the heated air/milk emulsion and/or the milk foam is pumped by the milk pump into the secondary processing device.

The secondary processing device 9 preferably comprises a homogenizer 95 which is provided to homogenize the milk foam 40, so that the air bubbles 41 are broken up and are distributed more uniformly throughout the milk. This secondary processing initially is realized such that the milk foam 40, as well as the air bubbles 41, hit the impact surfaces 971 at least once or repeatedly.

The type and intensity of the secondary processing in this case depends in particular on the pumping capacity and/or the speed of the milk pump 6, meaning on the pressure with which the milk pump 6 pumps the milk foam 40 into the secondary processing device 9. In this way, it is possible to influence the milk foam properties essentially via the milk pump 6, so as to generate different foam qualities (for example relating to the bubble size) which are particularly suitable for different specialty coffees, such as cappuccino or milk coffee or the like.

From the secondary processing device 9, the homogenized milk foam 40 is then dispensed through the outlet 2 into a container (not shown), for example into a cup.

The foam consistency of milk foam 40 which is produced during a continuous operation, so-to-speak, can be adjusted. As a result, milk foams with different consistencies can be produced according to the invention, ranging from very fine (with extremely small air bubbles 41) to rough (with large air bubbles 41 by comparison), which can furthermore vary from fluffy to creamy to solid.

Figure 2A:
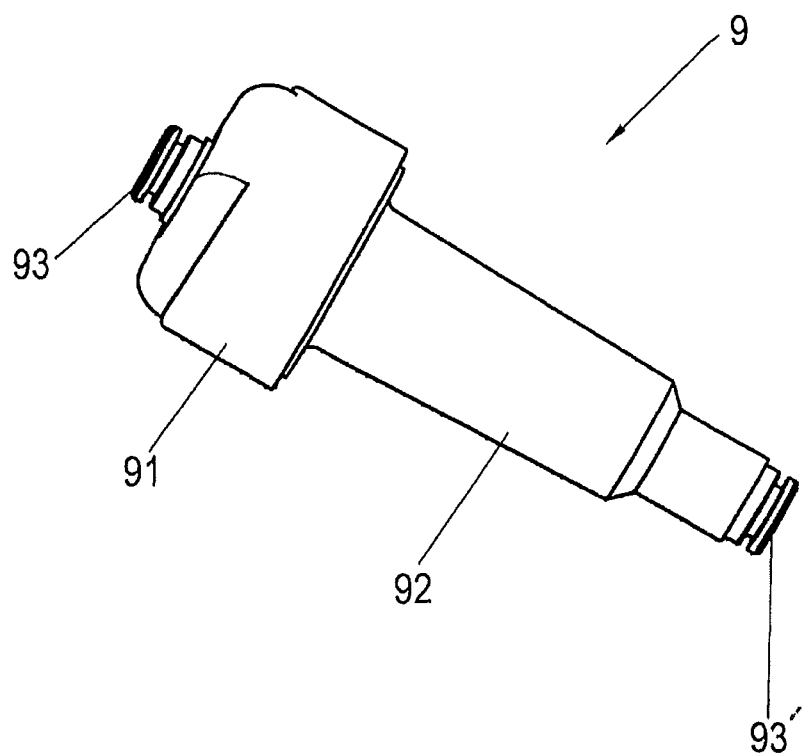
Figure 2D:
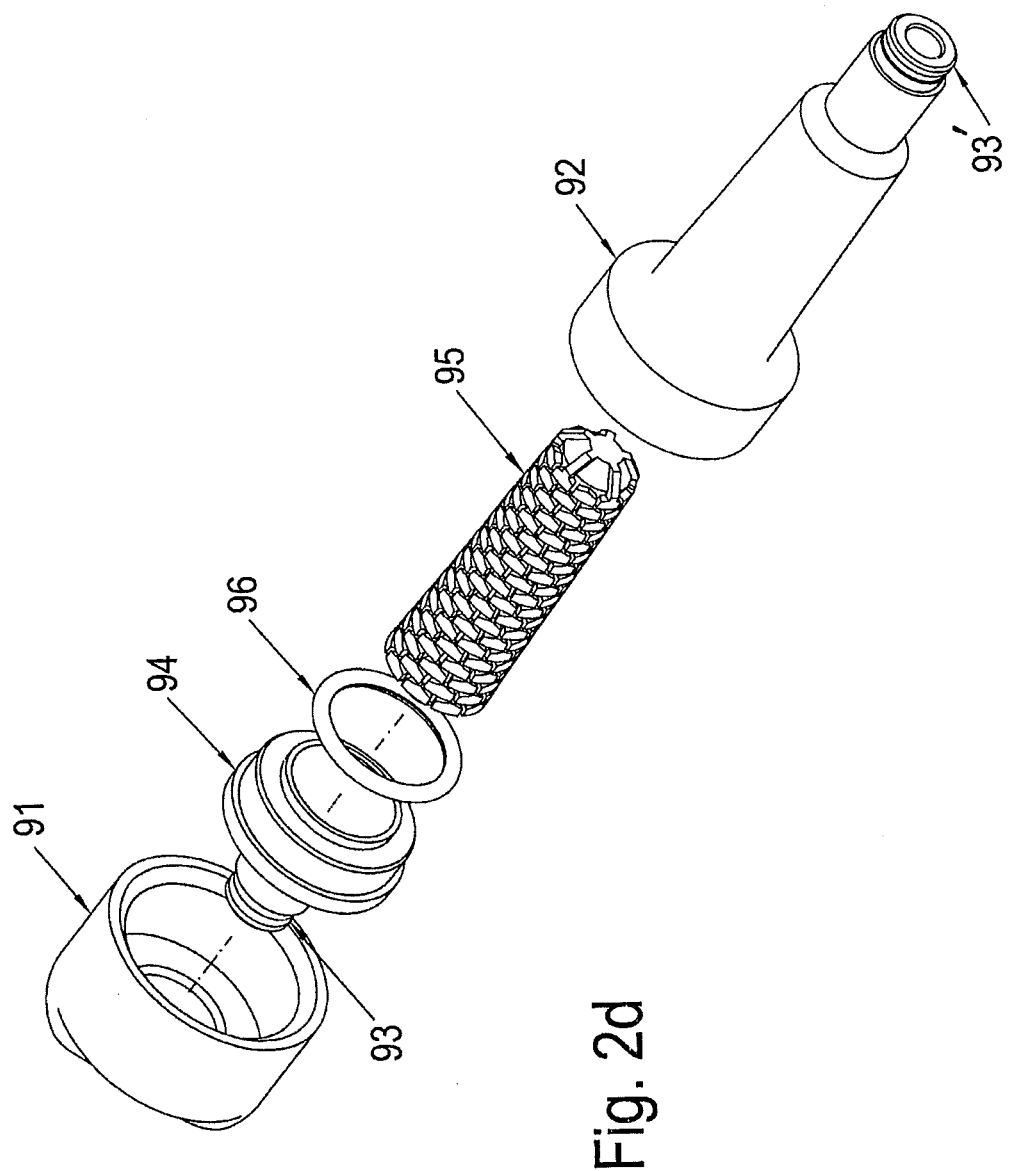

FIG. 2 shows various views of the secondary processing device 9. FIG. 2(*a*) shows a perspective view; FIG. 2(*b*) shows a view from the side; FIG. 2(*c*) shows a section A-A through the representation in FIG. 2(*b*); FIG. 2(*d*) shows an enlarged, exploded view.

The secondary processing device 9 comprises a housing which extends concentrically around an axis 30 and is formed with an upper housing part 91 and a lower housing part 92. The homogenizer 95 is arranged in the lower housing part 92. A top part 94 with a nozzle 941 is provided in the upper housing part 91. The upper housing part 91 and the top part 94 have a through bore (not given a reference), wherein a connecting insert 93 is provided in the top part 94 which functions as an inlet opening 20 for the milk/air mixture 40. The milk/air mixture 40 flows through the inlet opening 20 and the nozzle 941 to the homogenizer 95.

Owing to the pressure exerted by the milk/air mixture 40, the homogenizer 95 is pressed against an inside wall 921 of the housing for the lower housing part 92, wherein the homogenizer 95 has a conical shape, such that it is tapered in the extension direction 30. The homogenizer has an outside wall 957, positioned at an angle α of approximately 1°-5°, preferably 2°, relative to the axis 32, which allows achieving a good sealing effect. In addition, the milk/air mixture 40 is accelerated while flowing through the homogenizer 95.

The lower housing part 92 and its inside wall 921 furthermore are shaped to correspond to the shape of the homogenizer 95, meaning they are also conically shaped. As a result, the homogenizer 95 is centered by the pressure exerted by the milk/air mixture 40 and is pressed against the housing inside wall 921, so that it fits form-locking against this wall. The milk/air mixture 40 therefore cannot flow past, between the housing inside wall 921 and the outside wall 957 of the homogenizer 95.

The outside wall 957 of the homogenizer 95 is interspersed with a channel labyrinth 98 through which the milk/air mixture is pushed and, in the process, is homogenized, meaning the air bubbles in the milk/air mixture 40 are broken up and distributed evenly in the milk/air mixture 40.

Once the homogenized milk/air mixture 40 has flown through the homogenizer 95, it is discharged from the secondary processing device 9 through an outlet opening 21 in a connecting insert 93', which is arranged in a through bore (not given a reference) in the lower housing part 92.

The connecting insert 93 on the inlet side is sealed against the upper part 94, the upper part 94 is sealed against the lower housing part 92, and the outlet side connecting insert 93' is sealed against the lower housing part 92 with sealing rings 96, so that the milk/air mixture 40 cannot escape into the intermediate spaces (not given a reference) of the secondary processing device 9.

Figure 3A:
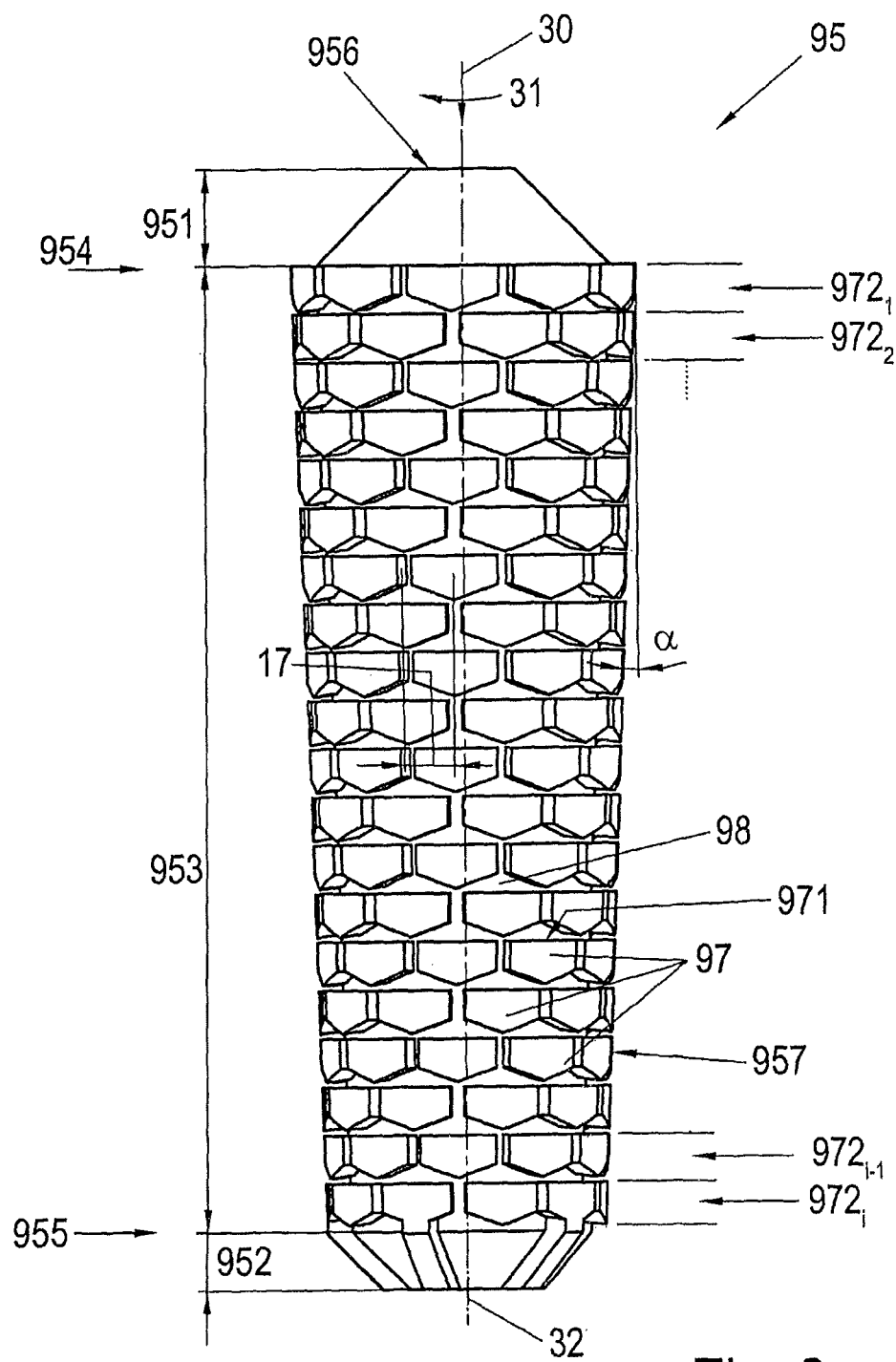
FIGS. 3a, 3b, and 3c—A homogenizer used in the secondary treatment device shown in FIG. 2, illustrated in a detailed side view in FIG. 3a, and respective detail views of FIG. 3a in FIGS. 3b and 3c.
Figure 3B:
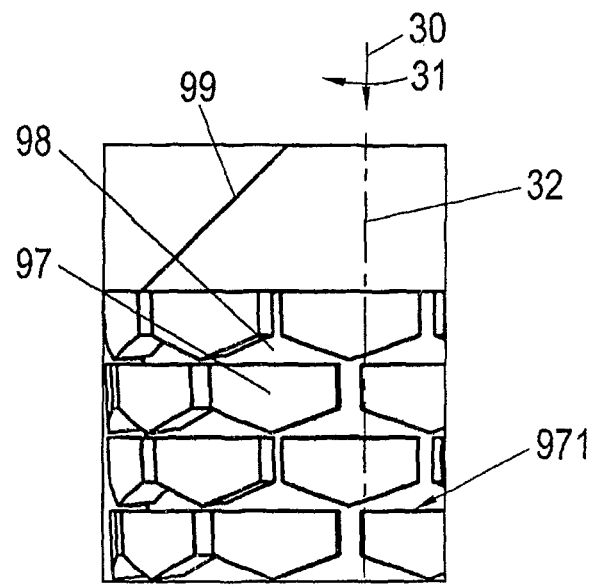
Figure 3C:
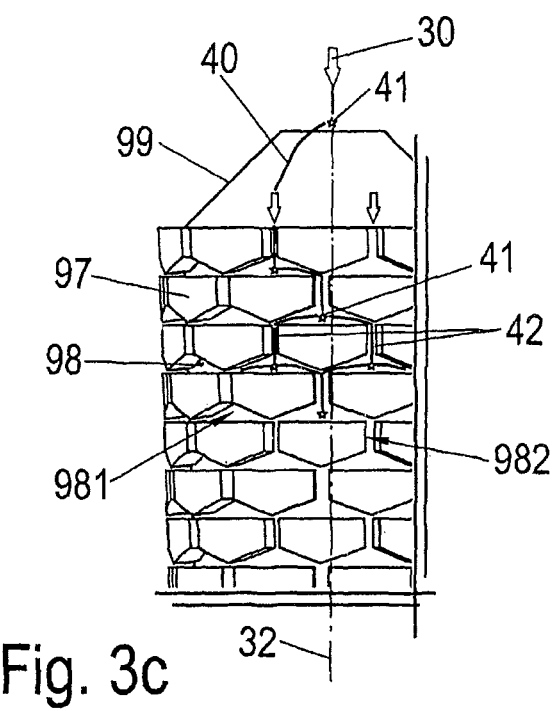

FIGS. 3a-3c show in 3a a detailed view from the side of the homogenizer and in 3b and 3c, respectively, a detail of the homogenizer according to FIG. 3a.

The homogenizer 95 has an inlet region 951, which is embodied in the manner of a truncated cone and is conically expanded in the extension direction 30. On the inlet side, the milk/air mixture during intake impacts an entrance surface 956, which makes an obtuse angle with a ramp 99 formed by the conical shape (FIG. 3b). The milk/air mixture 40 is then distributed uniformly in the circumferential direction 31 around the ramp 99.

A reduction region 953 adjoins the inlet area 951. The reduction region 953 comprises the outside wall 957 which is interspersed with the channel labyrinth 98. This region is also shaped conically, but is tapered in the extension direction 30.

The reduction region 953 is followed by an outlet region 952 where the homogenizer 95 has a truncated cone shape and is tapered further in the extension direction 30.

In the reduction region 953, impact bodies 97 are provided between which the channel labyrinth 98 extends. The impact bodies 97 respectively have an impact surface 971 which is hit by the partial flows 42 of the milk foam 40 when these flow through the channel labyrinth 98. On a side located opposite the impact surface 971, meaning the lower side of the impact bodies 97 in extension direction 30, the impact bodies 97 are respectively tapered. In the embodiment shown herein, the impact bodies 97 have a triangular shape.

In rows $972_1$, $972_2$-$972_i$, several impact bodies 97 are respectively arranged uniformly distributed, side-by-side, in the circumferential direction 31. In addition, several rows $972_1$, $972_2$-$972_i$ of impact bodies 97, arranged one below the other, are provided in the extension direction 30. The impact bodies 97 of the same row $972_1$, $972_2$-$972_i$ are respectively spaced apart, so that a channel 982 is formed in-between. The impact bodies 97 of the rows $972_1$, $972_2$-$972_i$ are furthermore respectively offset in the center, wherein this offset is indicated by double arrow 17. As a result, the impact surface 971 of an impact body 97 is always arranged below a channel 982.

An approximately triangle-shaped impact region 981 (FIG. 3c) is furthermore formed in this way above each impact body 97 which connects the channel 982 above the impact surface 971 of the impact body 97 with the two channels 982, adjoining on the side the impact body 97.

The channel labyrinth 98 comprises therefore a plurality of impact regions 981 which are connected by the channels 982.

A milk/air mixture 40 that flows through the secondary processing device 9 enters the channel labyrinth 98 on inlet end 954 of the reduction region 953 through the upper row $972_1$ of impact bodies 97 in the extension direction 30. In the process, milk/air mixture 40 is divided into approximately equally large partial flows 42 which flow through respectively one of the channels 982 of the upper row $972_1$.

The partial flows 42 respectively impact with the lower impact surface 971 that is arranged below the channel 82, wherein not only the partial flows 42 are divided, but also the air bubbles 41. The divided partial flows 42 then respectively flow through the channels 982, arranged on the side of the impact bodies 97 with which they impact. In the process, they are mixed with the respectively adjacent divided partial flows 42, to form respectively a new partial flow 42 that flows through the channels 982. This new partial flow then impacts with the following impact surface 971 of the subsequent row $972_1$, $972_2$-$972_i$ that follows in the extension direction 30 and is divided, wherein the air bubbles 41 are also divided once more. This operation is repeated until the milk/air mixture 40 has flowed through the last, lower row $972_i$ of the homogenizer 95 at its lower, outlet end 955.

The homogenized partial flows 42 converge once more in the outlet region 952, when flowing out through the outlet 21.

The partial flows 42 are pushed at high pressure through the channel labyrinth 98. The pressure depends on the pumping capacity of the milk pump 6 and can be adjusted via this pump. The air bubbles 41 impact with a high enough energy with the impact surface 971, so that they are divided upon impact. Owing to the conical shape of the homogenizer 95, the surface ratios are reduced and the partial flows 42 are accelerated. As a result, even at the lower outlet end 955 in the extension direction 30 the impact energy is sufficiently high to break up small air bubbles 41 during the impact.

When flowing through the homogenizer 95, the milk/air mixture 40 is therefore homogenized in that the air bubbles 41 continue to be reduced and the milk/air mixture 40 continues to be intermixed.

The milk foam subject to this secondary treatment is then dispensed from the secondary processing device through the outlet into a container, for example a cup.

Figure 4A:
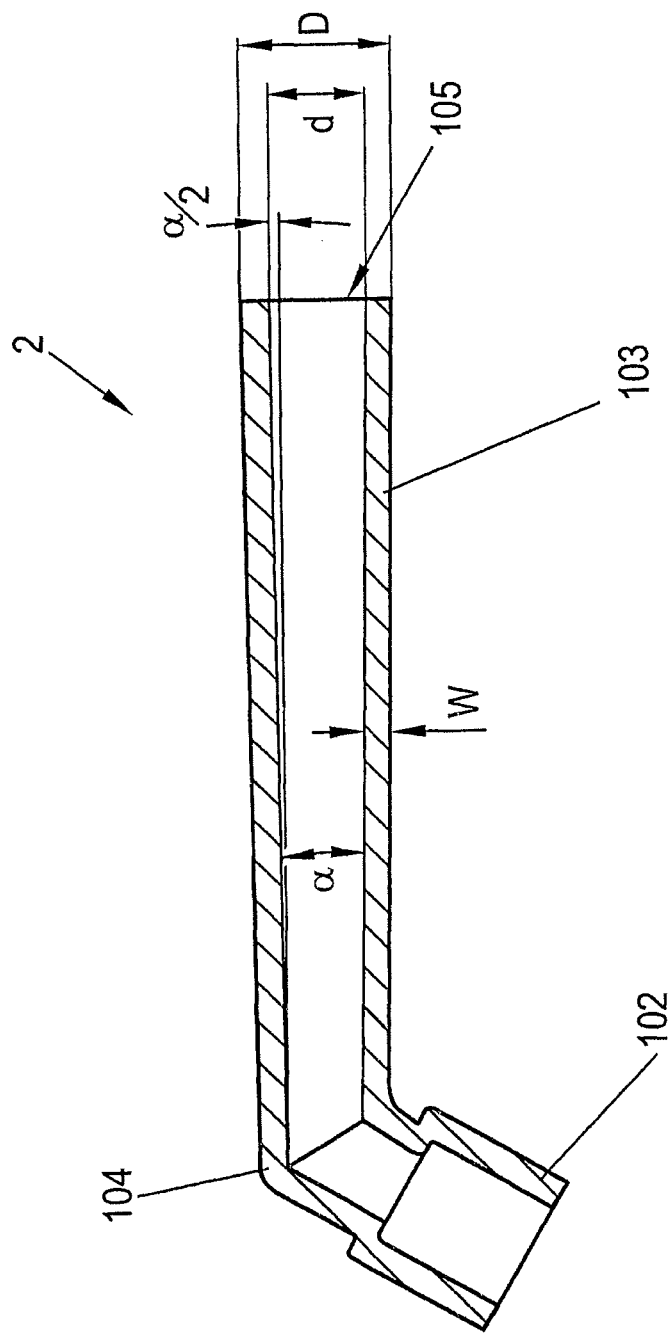
FIGS. 4a, 4b, and 4c—An outlet on a coffee maker including a cross section of the outlet as shown in FIG. 4a, a plan view of the outlet in FIG. 4b and a perspective view of the outlet in FIG. 4c.
Figure 4B:
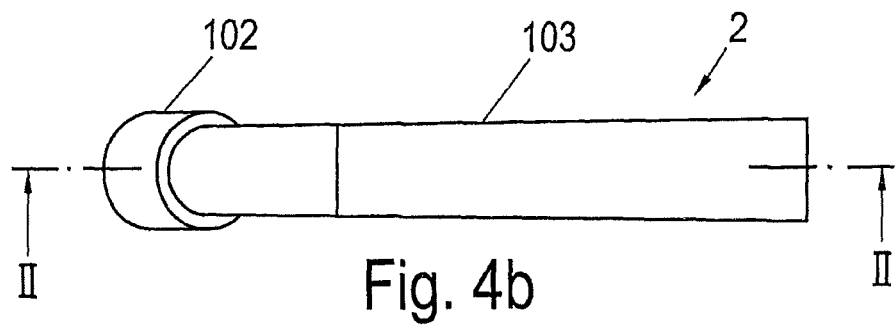
Figure 4C:
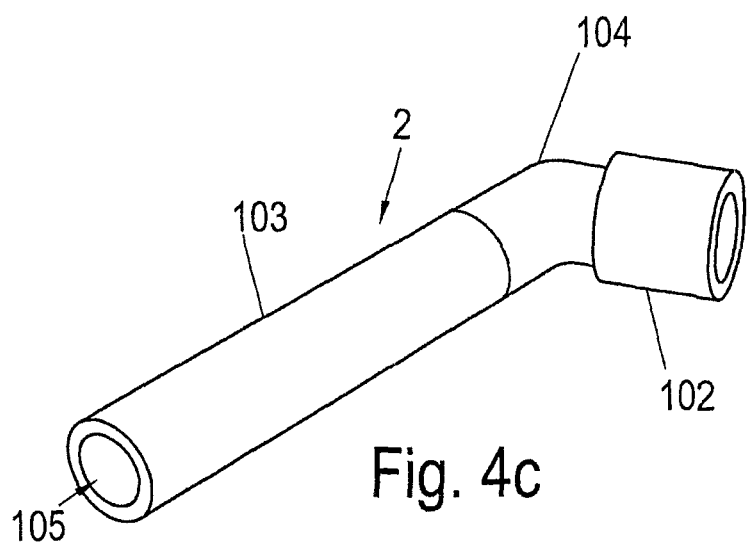

FIG. 4b shows a view from above of the outlet and/or the dispenser for the previously described device, which simultaneously can also function as an outlet for a higher-level coffee machine (not shown), in particular an automatic coffee maker. The outlet 2 comprises a sleeve-type coupling region 102 for connecting the outlet to the machine. As shown more clearly in the sectional view of FIG. 4a, the outlet 2 furthermore comprises an outflow section 103, for which the outside diameter D and the inside diameter "d" are enlarged/expanded in a downstream direction. Purely as an example, the outside diameter D in FIG. 1 is shown with a conical expansion. The outlet is preferably produced integrally from a plastic material with the aid of a shaping process, such as the injection-molding technique.

The outlet 2 has a basic tubular geometry, so that it can accommodate a beverage product, for example a coffee and/or milk product such as the milk foam from a milk foam producing device of the automatic coffee machine, and can conduct it into a ready container, for example a cup. Between the sleeve-type connecting piece 102 and the outflow section 103, the outlet 2 comprises a deflecting section 104 which functions to redirect the flowing beverage product. This is to be seen purely as an example, meaning it is also possible for the outlet 2 to comprise several deflection sections 104. In the deflection section 104 and especially in the outflow section 103, the outlet 2 may have a constant wall thickness W. It follows therefrom that the inside diameter d of the outflow section 103 is also expanded cone-shaped in downstream direction, wherein the cone-shaped expansion of the inside diameter d must be understood to be an example. Insofar as the expansion of the inside diameter d has a cone-shaped design, the conical angle α of the outflow section 103, expanded conically in the downstream direction, is selected to range from 2° to 10° and, especially preferred, from 3° to 6° for especially advantageous results. The length of the downstream expanded part of the outflow section 103 (here cone-shaped) is between 20 and 70 mm and preferably ranges from 30 to 50 mm.

The outlet 2 may be arranged symmetrical to the automatic device for a coffee machine, especially a fully automatic coffee maker, so that this machine may have two outlets.

Owing to the inside diameter d of the outflow section 103, which is expanded cone-shaped in the downstream direction, it is achieved that the beverage product securely leaves the outlet opening 105 of the outlet 2 and flows out through the center of the outlet opening 105 without noticeably changing the defined parameters of the milk foam, such as consistency and/or viscosity. The beverage product is therefore prevented from initially flowing horizontally along the edge of the outlet opening 105 which could wet in an undesirable manner the outside of a container, or even flow past the container, thereby causing an undesirable outflow or undesirably changing the consistency and/or the viscosity of the beverage product.

FIG. 5a shows a side view of circular jet nozzle that may be used to implement the first mixing chamber 5. The circular jet nozzle has a rectangular basic body 302, as well as a symmetrical basic geometry in this view.

FIG. 5b shows a sectional view from the front of the circular jet nozzle shown in FIG. 5a. The representation in FIG. 5a shows the basic body 302, which is also rectangular as seen from the front. The basic body 302 comprises a continuous (inner) milk channel 303, positioned horizontally relative to the drawing page plane, which empties into the milk channel 303. The downstream positioned end 304 of the milk channel 303 is provided with a plug insert 305. The plug insert 305 is pressed into the drilled out section of the milk channel 303 at the downstream-positioned end 304 of the milk channel 303. The plug insert 305 comprises a collar 306 which supports the insert on the basic body 302. The plug insert 305 furthermore has a shaft 307 which is inserted into the expanded and/or drilled out end 304 of the milk channel 303. The shaft 307 does not extend to the bottom of the milk channel 303 which is drilled out at the end 304, but ends before that.

The space between the shaft end and the bottom of the bore is provided with a seal 308, for example embodied as O-ring in this case. The plug insert 305 furthermore comprises a central through bore 309, which is arranged concentric to the milk channel 303.

The seal 308 here extends into the clear diameter of the through bore 309 in the plug insert 305, thereby sealing against environmental influences of a tube (not shown) or tubing (not shown) that is inserted into the through bore 309 in the plug insert 305. At the same time, the seal 308 functions to fix and hold in place an inserted hose and/or an inserted tube, so that it is prevented from sliding out of the through bore 309 of the plug insert 305.

Owing to the milk channel 303, a milk/air mixture is conducted via the through bore 309 of the plug insert 305 and the connected hoses and/or tubes and is dispensed from circular jet nozzle during operation.

A screw-in nipple 311 is screwed, for example, into a threaded bore 312 in the basic body 302 at the other end 310 of the milk channel 303. A seal 313 arranged between the threaded bore bottom and the shaft end of the screw-in nipple 311 seals the milk channel 303 against the environment. The seal 313 in this case is held in position by a centering extension 314 on the screw-in nipple 311 and is thus pre-tensioned. A plug insert 305a is pressed into the screw-in nipple 311. This plug insert 305a has the same functionality and geometry as the plug insert 305. For that reason, we forego a detailed description of the plug insert 305a.

The screw-in nipple 311 furthermore has a central bore 315 in the flow direction, which narrows down over several stages, for example at least two stages, in the manner of a nozzle and which forms the milk line 303 in the screw-in nipple 311. The graduated bore 315 comprises transitions 316, 316' between the stages, wherein the transitions 316, 316' are embodied herein, for example, as conical transitions. However, transitions 316, 316' with different geometries between the stages are possible as well. The stage with the smallest diameter for the graduated bore 315 is embodied as milk nozzle 317.

The milk nozzle 317 empties in flow direction into a mixing chamber 318, arranged concentric to the milk nozzle 317, which is formed by the section of the milk channel 303 when it expands in the basic body 302. The mixing chamber 318 has a cylindrical basic geometry. With reference to the vertical/perpendicular direction, relative to the drawing plane, a web 319 extends in radial direction into the mixing chamber 318, wherein the web projects preferably by more than 30% of the radius into the mixing chamber at the location of the bore 320.

The web extends axially into or up to a bore 320, formed by the narrowing down of the mixing chamber 318 in flow direction. The web can also stop axially precisely with the radius of the bore 320, wherein this is quite advantageous in view of hygiene/cleaning because no dead space develops behind the web in which impurities can easily accumulate.

A transition 321, shown here as cone-shaped example, can be seen between the mixing chamber 318 and the bore 320. The bore 320 empties in the downstream direction into a bore 322, for which the diameter is identical to that of the through bore 309 in the plug insert 305.

The basic body 302 furthermore comprises an air channel 323 that extends perpendicular, to the milk channel 303, so that the milk channel 303 and the air channel 323 jointly form a T-shaped line connection. The air channel 323 is provided with a plug insert 324, wherein the plug insert 324 has the same basic geometry as the plug inserts 305 and/or 305a of the milk channel 303. The plug insert 324 differs from the plug inserts 305 and/or 305a of the milk channel only in its dimensions which are smaller than those of the plug inserts 305, 305a of the milk channel 303. A further description of the plug insert 324 is therefore unnecessary to avoid repetition.

The air channel 323 furthermore has a central section which narrows down in the manner of a nozzle in flow direction. For the exemplary embodiment shown in FIGS. 5b, 5c, the nozzle-type narrowing is cone-shaped, wherein other geometric embodiments of the nozzle-type narrowing are also possible. Further downstream, the air channel 323 in the form of an air nozzle 326, which essentially extends inside the web 319 that projects into the mixing chamber 318, empties radially into the mixing chamber 318 relative to the direction of flow in milk channel 303.

Owing to the center section 325 of the air channel 323, which narrows down nozzle-shaped, the air flowing during the operation of the circular jet nozzle in the air channel 323 is compressed, accelerated and metered, which supports the feeding of a uniform air supply into the mixing chamber 318 and prevents the forming of undesirable two-phase systems.

As a result of the graduated bore 315 of the milk channel 303, which empties via a milk nozzle 317 into the mixing chamber 318, the flow of milk is accelerated, so that turbulences develop in the milk flow in the mixing chamber 318 as a result of decompression. Owing to the air supplied via a web 319, which projects radially into the mixing chamber 318, the air flowing through the air channel 323 is metered with high speed into the mixing chamber 318, in a region of high milk-flowing speed. Air and milk thus are mixed together in an especially advantageous manner, so that homogeneous milk foam with defined properties is produced.

FIG. 5c shows the air channel 323 in a sectional view from the side. In FIG. 5c, the cylindrical basic geometry of the mixing chamber 318 can be seen easily. The web 319, which extends into the mixing chamber 318, has a truncated-pyramid type basic geometry. FIG. 5c furthermore shows that the free radius of the mixing chamber 318 in the region of the web 319 corresponds to that of the bore 320 (FIG. 5b) which is formed by a nozzle-type narrowing down of the mixing chamber 318 in flow direction. The flow paths of the milk channel 303 are geometrically designed such that they support an automatic cleaning of the milk channel, wherein the pyramid-type truncated web 319 contributes to this.

Figure 6A:
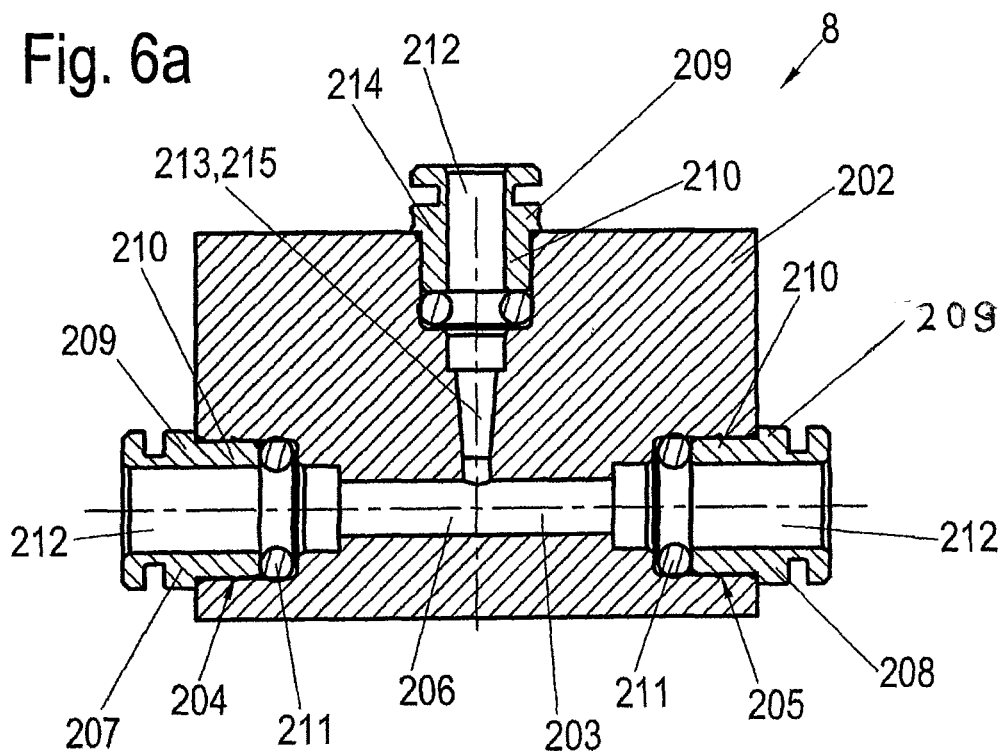
FIGS. 6a and 6b—A steam nozzle to introduce steam into the milk foam, including a sectional view shown in FIG. 6a and a perspective view shown in FIG. 6b.
Figure 6B:
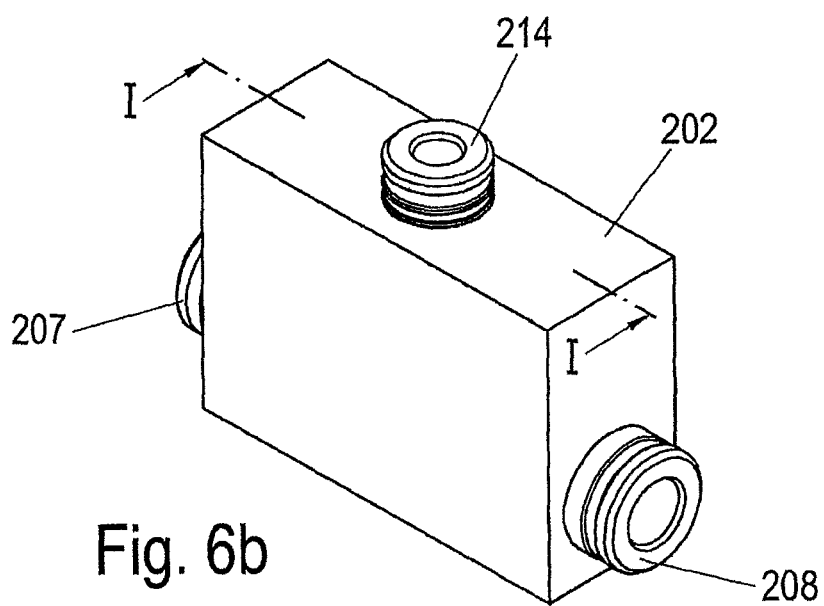

FIG. 6a, finally, shows a sectional view of a preferred steam jet nozzle which may be employed to implement the second mixing chamber 8. The steam jet nozzle has a rectangular basic body 202, as well as a symmetrical basic geometry. The basic body 202 comprises a horizontally extending steam channel 203, relative to the drawing plane. The steam channel 203 is expanded at both its ends 204, 205 in two stages and/or is drilled out, so that the steam channel 203 has a larger diameter at its ends 204, 205 than in the center section 206.

The two ends 204, 205 of the steam channel 203 are respectively provided with one plug insert 207, 208. The plug inserts 207, 208 are respectively pressed into the drilled out portions of the steam channel 203, at the ends 204, 205 of the steam channel 203. The plug inserts 207, 208 are respectively provided with a collar 209 which functions to support the inserts on the basic body 202. Each of the plug inserts 207, 208 furthermore comprises a shaft 210 which is inserted into the drilled out and/or expanded end 204, 205 of the steam channel 203. The shaft 210 respectively does not extend to the bottom of the steam channel 203, which is drilled out at the ends 204, 205, but ends before that. The space between the shaft end and the bottom of the bore is provided with a seal 211 which is embodied, for example, as an O-ring in this case. The plug inserts 207, 208 are furthermore provided with a through bore 212 that is arranged concentric to the steam channel 203.

The extension of the through bore 212 in the plug inserts 207, 208 forms the first stage of the gradual expansion of the steam channel 203. The seal 211 extends into the clear diameter of the through bore 212 in the plug inserts 207, 208 and thus seals off a hose (not shown) or tubing (not shown) inserted into the plug inserts 207, 208 against the surrounding area. The seal 211 simultaneously functions to fix and hold in place an inserted hose and/or tubing, so that the hose and/or tubing is prevented from sliding out of the through bore 212 in the plug inserts 207, 208.

When the steam jet nozzle is operational, steam is conducted through the steam channel 203 via the through bores 212 in the plug inserts 207, 208 and the thereto connected hoses and/or tubing.

The basic body 202 furthermore comprises a milk channel 213, which extends concentrically to its axis of symmetry which is radial relative to the steam channel 203, so that the steam channel 203 and the milk channel 213 form a T-shaped line connection. The milk channel 213 is expanded analogous to the steam channel 203 in an upward direction, in the drawing plane, and is also provided with a plug insert 214. This plug insert has the same basic geometry as the plug inserts 207, 208 of the steam channel 203, but differs in its dimensions from the plug inserts 207, 208 of the steam channel. These dimensions are on the whole smaller than those of the plug inserts 207, 208 of the steam channel 203. A further description of the plug insert 214 is therefore unnecessary to avoid repetition.

The milk channel 213 (which empties into the steam channel 203 furthermore has a center section 215 which narrows down in the manner of a nozzle in the flow direction. According to the exemplary embodiment shown in FIG. 6a, the nozzle-type reduction is embodied cone-shaped, wherein other geometric forms for a nozzle-type narrowing are possible as well. Further downstream, the milk channel 213 in the form of a cylindrical segment (unnumbered) empties perpendicularly into the steam channel 203.

Owing to the nozzle-type narrowing of the center section 215 of the milk channel 213, a milk product, for example a mixture of brewed coffee and milk foam, which flows with a defined volume toward the steam channel 203 during the operation of the steam jet nozzle, is accelerated. As a result of the constant diameter of the center section 206 of the steam channel 203, without a deceleration zone as is the case with a traditional mixing chamber, with consistently high and uniform flow speed for the flowing steam, the milk product arriving through the milk channel 213 is initially condensed. Subsequently, the milk product is uniformly metered into the flow of steam in the steam channel 203 and is mixed with the steam, thereby being warmed uniformly by the steam, without having a tendency to form undesirable two-phase systems.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An apparatus for producing a milk product, comprising:
a milk container for holding milk;
an outlet device to dispense the milk product of the apparatus into a container, wherein the outlet device has a tubular geometry with a length, an inside diameter along the length and an outlet end from which the milk product is dispensed from the apparatus, and the inside diameter of the outlet device expands along the length toward the outlet end;
a milk line connected between the milk container and the outlet device;
a first mixing chamber installed in the milk line to mix milk and air to produce milk foam; and
a milk pump having an adjustable speed and coupled in the milk line.

2. The apparatus according to claim 1, wherein the milk pump has an adjustable capacity which is changed by adjusting the speed of the milk pump.

3. The apparatus according to claim 1, further comprising a second mixing chamber downstream of the first mixing chamber and adapted to add steam to the milk foam to heat up the milk foam in the milk line.

4. The apparatus according to claim 1, including a secondary processing device installed in the milk line downstream of the milk pump to further process the milk foam to reduce bubble size in the milk foam.

5. The apparatus according to claim 4, wherein the secondary processing device comprises a channel labyrinth.

6. The apparatus according to claim 1, wherein the outlet device expands conically toward the outlet end.

7. The apparatus according to claim 1, wherein the first mixing chamber comprises a circular jet nozzle having an inner milk channel, the inner milk channel having a radius that expands to form a mixing chamber, wherein the circular jet nozzle further comprises a web and that extends radially into the mixing chamber and an air channel that extends inside the web and empties into the mixing chamber.

8. The apparatus according to claim 3, wherein the second mixing chamber comprises a steam jet nozzle including: a steam channel with a radius; and an inner milk channel coupled to the milk line, wherein the inner milk channel empties radially into the steam channel.

* * * * *